(12) United States Patent
Patel

(10) Patent No.: US 8,990,604 B2
(45) Date of Patent: Mar. 24, 2015

(54) ALTERNATELY SENSING VOLTAGE ON SUPPLY SIDE OR LOAD SIDE OF A POWER GATE OF AN ELECTRONIC DEVICE AND MODIFYING FEEDBACK INPUT OF A POWER SUPPLY CONTROLLED BY THE POWER GATE BASED ON WHICH SIDE OF THE POWER GATE IS CURRENTLY SENSED

(75) Inventor: Parin Patel, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 662 days.

(21) Appl. No.: 13/273,898

(22) Filed: Oct. 14, 2011

(65) Prior Publication Data

US 2013/0097450 A1 Apr. 18, 2013

(51) Int. Cl.
| G06F 1/00 | (2006.01) |
| G06F 1/32 | (2006.01) |
| G06F 1/26 | (2006.01) |
| G06F 1/30 | (2006.01) |

(52) U.S. Cl.
CPC ............... *G06F 1/3287* (2013.01); *G06F 1/26* (2013.01); *G06F 1/30* (2013.01); *G06F 1/3243* (2013.01); *G06F 1/3296* (2013.01); *Y02B 60/1282* (2013.01); *Y02B 60/1239* (2013.01); *Y02B 60/1285* (2013.01)
USPC .......................................................... 713/340

(58) Field of Classification Search
CPC ....... G06F 1/32; G06F 1/3206; G06F 1/3234; G06F 1/3243; G06F 1/3287
USPC .......................................................... 713/340
See application file for complete search history.

(56) References Cited

U.S. PATENT DOCUMENTS

| 4,193,116 | A | * | 3/1980 | Funk ................................ 702/23 |
| 5,477,123 | A | * | 12/1995 | Allen et al. .................... 320/124 |
| 5,481,730 | A | * | 1/1996 | Brown et al. ................. 713/340 |
| 5,508,603 | A | * | 4/1996 | Strong, III .................... 323/234 |
| 5,661,442 | A | * | 8/1997 | Sparks .......................... 332/149 |
| 5,672,958 | A | * | 9/1997 | Brown et al. ................. 323/269 |
| 5,672,997 | A | * | 9/1997 | Shield ........................... 327/538 |
| 5,894,413 | A | * | 4/1999 | Ferguson ........................ 363/65 |
| 6,014,322 | A | * | 1/2000 | Higashi et al. .................. 363/65 |

(Continued)

FOREIGN PATENT DOCUMENTS

| JP | 2009027872 A | * | 2/2009 |
| KR | 1020070013631 | | 1/2007 |

(Continued)

OTHER PUBLICATIONS

International Search Report in Application No. PCT/US2012/056561, mailed Dec. 10, 2012, pp. 1-4.

(Continued)

*Primary Examiner* — Thomas Lee
*Assistant Examiner* — Santosh R Poudel
(74) *Attorney, Agent, or Firm* — Meyertons, Hood, Kivlin, Kowert & Goetzel, P.C.

(57) ABSTRACT

A power gate is coupled to a power supply circuit to selectively provide power to a processing core. A switch has a local state and a remote state to alternately route (i) a local sense point on a supply side of the power gate and (ii) and a remote sense point on a load side of the power gate, to a load voltage feedback input of the power supply circuit. Timing logic and driver circuitry control the power gate and the switch in response to a processing core enable signal. Other embodiments are also described.

20 Claims, 2 Drawing Sheets

(56) References Cited

U.S. PATENT DOCUMENTS

| | | | |
|---|---|---|---|
| 6,181,030 B1* | 1/2001 | Carpenter et al. | 307/113 |
| 6,774,612 B1* | 8/2004 | Ballenger et al. | 323/303 |
| 7,187,157 B1* | 3/2007 | Dix | 323/271 |
| 7,397,228 B2 | 7/2008 | Barrows et al. | |
| 7,447,924 B2 | 11/2008 | May | |
| 7,518,355 B2* | 4/2009 | Grassi et al. | 324/757.04 |
| 7,701,245 B1 | 4/2010 | Vasudevan | |
| 7,765,415 B2* | 7/2010 | Ishikura et al. | 713/310 |
| 7,808,856 B2 | 10/2010 | Ehrenreich et al. | |
| 7,839,218 B2 | 11/2010 | Shimamoto et al. | |
| 7,880,284 B2 | 2/2011 | Zelikson et al. | |
| 8,013,669 B2* | 9/2011 | Suzuki et al. | 327/544 |
| 8,015,419 B2 | 9/2011 | Rowhani et al. | |
| 8,024,591 B2 | 9/2011 | Bertelsen et al. | |
| 8,084,885 B1* | 12/2011 | Zansky et al. | 307/60 |
| 8,278,997 B1* | 10/2012 | Kim et al. | 327/541 |
| 8,370,654 B1* | 2/2013 | Hasko et al. | 713/300 |
| 2006/0022525 A1* | 2/2006 | Landry | 307/86 |
| 2006/0077699 A1* | 4/2006 | Comiskey | 363/89 |
| 2006/0197514 A1 | 9/2006 | Halberstadt | |
| 2008/0001629 A1* | 1/2008 | Martiny | 326/82 |
| 2008/0054724 A1* | 3/2008 | Hosomi et al. | 307/69 |
| 2008/0238407 A1* | 10/2008 | Grassi et al. | 324/149 |
| 2008/0307244 A1* | 12/2008 | Bertelsen et al. | 713/323 |
| 2009/0039855 A1* | 2/2009 | D'Souza et al. | 323/285 |
| 2010/0133905 A1* | 6/2010 | Chang et al. | 307/31 |
| 2010/0194470 A1* | 8/2010 | Monchiero et al. | 327/566 |
| 2010/0214863 A1* | 8/2010 | Chan et al. | 365/228 |

FOREIGN PATENT DOCUMENTS

| | | |
|---|---|---|
| KR | 1020090077952 | 7/2009 |
| TW | 200532427 | 10/2005 |
| TW | 200903246 | 1/2009 |

OTHER PUBLICATIONS

Preliminary Rejection from Korean Patent Application No. 10-2012-106544, mailed Dec. 11, 2013, (English and Korean Versions), pp. 1-10.

"Multi-Output Controller with Integrated MOSFET Drivers for AMD SVI Capable Mobile CPUs", ISL6265C, intersil®, Product Specification, Jul. 28, 2010, FN6976.1, (27 pages).

"New Solutions for Slew-Rate Controlled Switching, Instant Power-On, and Battery Disconnect from Siliconix, an 80/4% Subsidiary of Vishay", Press Release, Vishay Intertechnology, Inc., Sep. 9, 2011, Internet download at: http://www.vishay.com/company/press/releases/2000/000712p . . . , (2 pages).

"S A, 1.2 V, Slew Rate Controlled Load Switch", SiP32411, Vishay Siliconix, Document No. 66710, Aug. 22, 2011, (pp. 1-5).

Day, Michael , "Optimizing Low-Power DC/DC Designs—External versus Internal Compensation", Texas Instruments, Workbook 5-1 through 5-11. Copyright 2004, Texas Instruments, Incorporated, Dallas, TX, (11 pages).

Leverich, Jacob , et al., "Power Management of Datacenter Workloads Using Per-Core Power Gating", HP Laboratories, HPL-2009-326, Sep. 21, 2009, Internet document at: www.hpl.hp.com/techreports/2009/HPL-2009-326.pdf, (4 pages).

Notice of Allowance from Korean Patent Application No. 10-2012-106544, issued Jun. 27, 2014, Korean version, pp. 2-3.3.

Office Action from Taiwanese Application No. 101136090, issued Jul. 9, 2014, English and Chinese versions, pp. 1-12.

International Preliminary Report on Patentability from PCT/US2012/056561, mailed Apr. 24, 2014, pp. 1-7.

Rejection from Taiwanese Application No. 101136090, issued Oct. 28, 2014, English and Chinese versions, pp. 1-13.

Office Action from Chinese Application No. 201210478451.7, issued Nov. 2, 2014, English and Chinese versions pp. 1-37.

\* cited by examiner

ALTERNATELY SENSING VOLTAGE ON SUPPLY SIDE OR LOAD SIDE OF A POWER GATE OF AN ELECTRONIC DEVICE AND MODIFYING FEEDBACK INPUT OF A POWER SUPPLY CONTROLLED BY THE POWER GATE BASED ON WHICH SIDE OF THE POWER GATE IS CURRENTLY SENSED

FIELD

An embodiment of the invention relates to voltage sensing and voltage regulation in microprocessor cores that are power gated. Other embodiments are also described.

BACKGROUND

A multi-core microprocessor is a computing component that has two or more generally independent processing units or processor cores that read and execute program instructions. Manufacturers typically integrate the cores onto a single integrated circuit die or, alternatively, into multiple dies in a single integrated circuit package. For example, the Apple A5 system-on-a-chip (SoC) designed by Apple, Inc. of Cupertino, Calif. contains a dual-core central processing unit and a dual-core graphics processing unit.

To reduce leakage power on inactive cores, multi-core systems use the concept of power gating where the supply of power to a particular core is cut off by a power gate, such that the core power supply voltage will decay to essentially zero volts. A remaining active core may continue to be supplied with an appropriate voltage level at its power supply input. The power gate is coupled in series with and between the power supply and either a power supply pin or a ground pin of a core, in order to provide power to the processing core. The power gate of each core is typically made of a large number of solid state transistor switches that are connected in parallel and that are controlled together, by some sort of a power manager block or program routine.

The power supply circuit typically used to power a multi-core microprocessor is a regulated, switch mode DC power supply that is designed to deliver the needed current to power a particular core that is active, while maintaining the core supply voltage at a regulated DC level. The regulator in the power supply circuit performs a control algorithm that maintains the correct regulation voltage despite varying load current, based on obtaining voltage feedback from the load that it is driving. A voltage sense line from the processing core's supply pin can be routed to the feedback input of the regulator in order to monitor the load voltage and use it to maintain the regulation. This so-called remote or downstream sensing of the load voltage is desirable, because otherwise the power gate and any other parasitic impedance that lies in the path between a regulator pin and a power supply or ground pin of the core will cause an appreciable voltage drop, particularly at high current, thereby reducing the power supply voltage provided to the processing core (if a local sense point were used for the feedback input).

SUMMARY

An embodiment of the invention is an electronic system having a processing core and a power supply circuit that has a load voltage feedback input. A power gate is coupled to the power supply circuit, to selectively provide power to the processing core. A switch has a local state and a remote state, to route either a local sense point on a supply side of the power gate or a remote sense point on a load side of the power gate, to the feedback input of the power supply circuit. Timing logic and driver circuitry control the power gate and the switch. The timing logic and driver circuitry control the power gate and the switch in response to a processing core enable signal, which may be generated by a power manager that is in charge of making decisions on whether the processing core should be active or not. The above arrangement may be repeated for multiple processing cores.

The timing logic and driver circuitry, while controlling the power gate and the switch, maintain a predefined timing between the opening and closing of the power gate on the one hand and selecting between the local and remote states of the switch on the other. For instance, in response to the processing core enable signal being asserted, the power gate is opened before selecting the remote state of the switch. In contrast, when the processing core enable signal is deasserted, signifying that the processing core is to be inactive, the power gate is closed after having selected the local state of the switch. Such timing helps avoid drastic transitions by the power supply circuit due to sudden changes in the feedback voltage between the active and inactive states of the processing core.

In one embodiment, the power supply circuit includes a switch mode voltage regulator control loop into which the load voltage feedback input is coupled. This control loop has a tunable compensation network that is adjustable in-the-field (i.e., while being operated by an end user) as a function of the state of the switch. In other words, at least two different transfer functions are available in the compensation network, one for use during remote sense and another for use during local sense. This may enable the voltage regulator to be more stable or less susceptible to oscillations.

In another embodiment, the timing logic and switch driver circuitry has a further input that is directly coupled to the remote sense point. The switch driver circuitry contains additional circuitry that controls the power gate so as to limit the slew rate of the voltage on the load side of the power gate, based on a signal at the further input (which represents the voltage of the load side). This allows the power gate to turn on more softly, thereby reducing in-rush current.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

Figure 1:
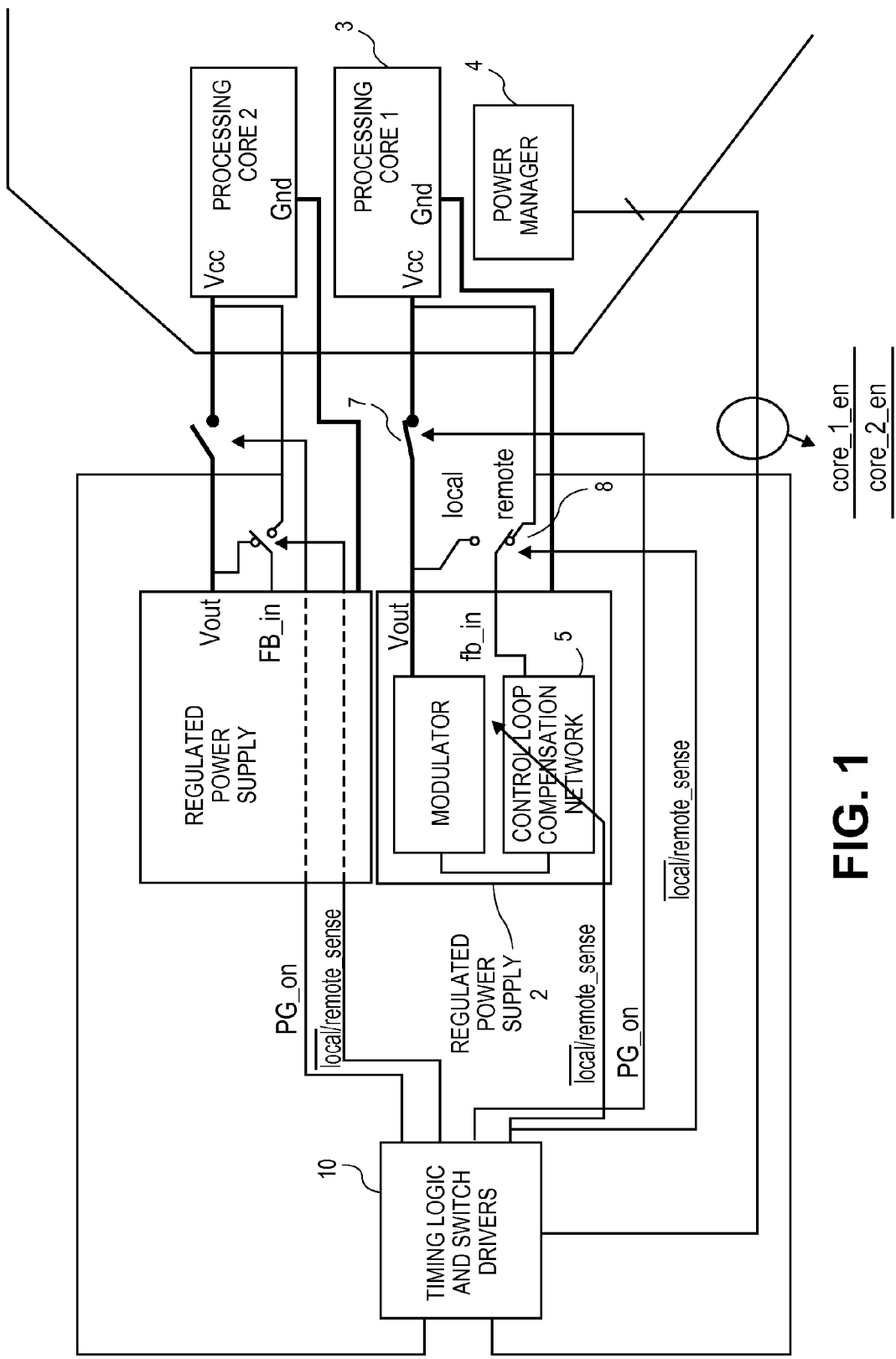
FIG. 1 is a circuit schematic of power supply and power gate circuitry according to an embodiment of the invention.

FIG. 1 is a circuit schematic of a power supply and power gate arrangement in accordance with an embodiment of the invention. What is shown is part of an electronic system having a processing core 3 with power supply input Vcc coupled to a power output Vout of a regulated power supply 2. A second processing core and associated power supply and gating circuitry is also shown, that may be essentially similar to the core described here. The processing core 3 also has a power return or ground pin that is also coupled to a power return or ground pin of the regulated power supply 2. A power gate 7 is coupled between Vout and Vcc in order to deliver power to the processing core 3. As an alternative, the power gate 7 could be coupled between the ground pins of the processing core 3 and the power supply 2—see FIG. 3 described below. The system also has a switch 8 with at least two states, namely, a local state and a remote state. As can be seen, the switch routes either a local sense point on a supply side of the power gate 7, or a remote sense point on a load side of the power gate 7, to a load voltage feedback input FB_in of the regulated power supply 2.

Control of the power gate 7 and the switch 8 are by timing logic and switch driver circuitry 10. The circuitry 10 contains timing logic that helps maintain a predefined timing between the opening and closing of the power gate 7 on the one hand, and selection of either local or remote sense on the other. The circuitry 10 also includes drivers needed to control the switch 8 and the power gate 7. For instance, the power gate 7 may be implemented as a group of numerous field effect transistor (FET) switches that are directly connected in parallel, where the circuitry 10 would contain the analog drivers needed to swing the gate electrode voltages of the FET switches. Other solid-state switch technologies are possible, of course. As to the switch 8, since it only passes very little current, in comparison to the power gate 7, the switch 8 can be implemented using, for instance, a single FET switch for each sense point. Other more complex solid-state circuit designs for the switch 8 and the power gate 7 are possible.

The timing logic and driver circuitry 10 controls the power gate 7 and the switch 8 in response to receiving a processing core enable signal. This may be a digital control signal depicted in FIG. 1 as core_I_en, which has been generated by a power manager 4. The power manager 4 may be a conventional data processing block that is typically present in multi-core microprocessors or systems-on-chip that decides whether any particular processing core should be inactive, e.g. depending upon whether a program that is currently running can be properly executed by a single core, in order to conserve power. The power manager 4 may also make other decisions including dynamic voltage scaling and dynamic frequency scaling of the processing cores, again to conserve power. The power manager may be in the same integrated circuit die as the processing core 3.

Figure 2:
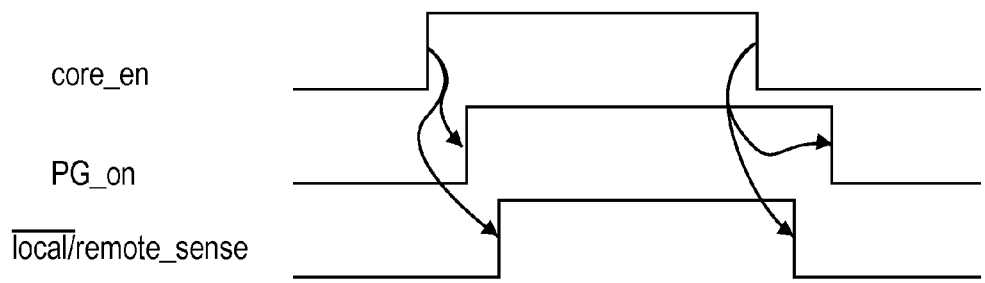
FIG. 2 shows example waveforms for the relevant control signals in the power supply and power gate arrangement of FIG. 1.

An example of the predefined timing between the opening and closing of the power gate 7 on the one hand and the selection of the local or remote states of the switch 8 on the other is given in FIG. 2. That figure shows a timing diagram of the three digital control signals shown in FIG. 1, namely, the processing core enable signal core_en, power gate control signal PG_on and the control signal for the switch 8, namely, local#/remote_sense. The latter two control signals may be defined in relation to the processing core enable signal so that, for instance, a rising edge of core_en (signifying that the core is active or enabled) causes the power gate 7 to be opened and the remote sense point to be selected. Note, however, the relative timing between the power gate being opened (or turned on) and the remote sense being selected; in other words, the power gate is turned on while the feedback input of the regulated power supply 2 is still at local sense. The relative delay between PG_on being asserted and remote_sense being asserted may be relatively short in order to ensure that when the core activity increases (thereby increasing the load on the power supply 2), the load voltage feedback has been switched to remote_sense so that the voltage at the supply input of the core 3 quickly stabilizes to its specified or required minimum value (without exhibiting the typical voltage drop that is cause by the parasitics in the power gate 7).

FIG. 2 also shows an example of timing when the core_en signal is deasserted, indicating that the core 3 is to be inactivated. Here, in response to the falling edge of core_en, the feedback input of the power supply 2 is switched to local sense, before the power gate is closed or turned off. Note that when the power gate is closed (or turned off) here, the voltage at the power supply pin of the core 3 will decay. However, that is of no consequence to the power supply 2 since just as or before the decay begins, the feedback input has been switched to local sense, thereby maintaining a steady behavior of the power supply 2. The relative delay between local#_sense being asserted and PG_on being deasserted can be suitably short so long as the power supply 2 is stable upon switching to the local sense point.

Figure 3:
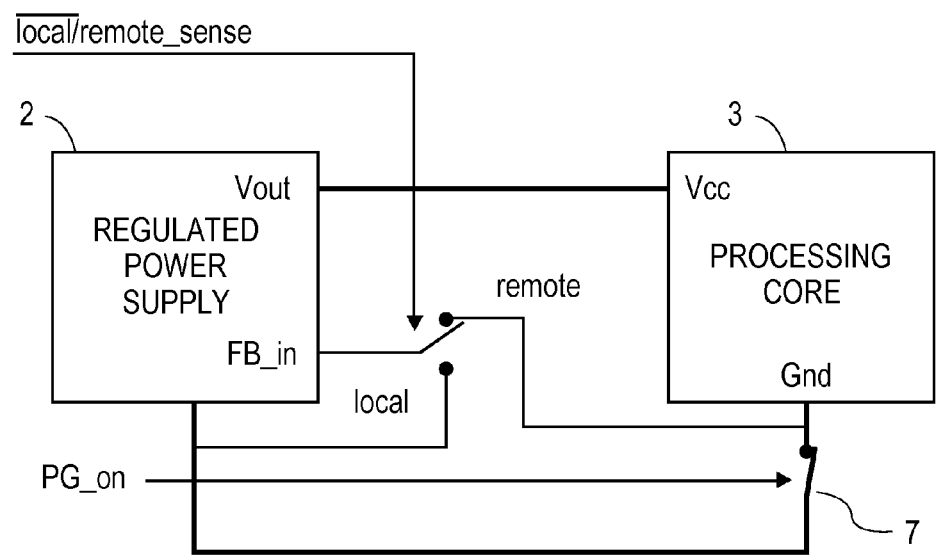
FIG. 3 is a circuit schematic of another embodiment.

FIG. 3 is a circuit schematic of another embodiment of the invention, where the power gate 7 in this case is directly connected between a ground pin of the processing core 3 and a ground pin of the power supply circuit. This is in contrast to FIG. 1, where the power gate 7 is directly connected between the Vout pin of the power supply 2 and the power supply pin Vcc of the core 3. In the "low side" embodiment of FIG. 3, the switch 8 still selects between remote and local sense points, however, in this case the remote and local sense points are at ground or reference points, rather than at Vcc or Vout points. Also, while not shown, the error amplifier circuitry that is typically used in a regulated power supply (to compare the load voltage that is received through FB_in to a reference) may be different in the low side embodiment of FIG. 3, than in the "high side" embodiment of FIG. 1.

The power supply and power gate arrangements described above can support the following method for operating an electronic system. As a processing core enable signal is received, and in response to the signal being asserted, a power gate is signaled to open, to thereby deliver power from a power supply circuit to a processing core. Only after the power gate has been opened is then a feedback input of the power supply circuit switched from a local sense point to a remote sense point. Now, when a decision is then made to inactivate the core, such that the processing core enable signal is deasserted, the feedback input of the power supply circuit is switched from the remote sense point back to the local sense point, prior to signaling the power gate to close (and thereby stop delivering power to the processing core). Such timing may help maintain the power supply stable as the latter is repeatedly tasked with providing power through a power gate that may be opened and closed numerous times during operation of a multi-core microprocessor (in order to save power).

In one embodiment, the regulated power supply is a switch mode dc voltage regulator having a control loop into which the load voltage feedback input fb_in is coupled. As shown in FIG. 1, the control loop includes a modulator and a compensation network 5. The compensation network 5 is tunable in that it is adjustable in-the-field (i.e., while being operated by an end user) as a function of the state of the local/remote switch. In other words, at least two different transfer functions are available in the compensation network 5, namely one for use during remote sense and another for use during local sense. This may enable the voltage regulator to be more stable (or less susceptible to oscillations) when it is driving significantly different loads, i.e. when the processing core 3 is inactive and when the processing core is active and performing a heavy computing task.

In another embodiment, also shown in FIG. 1, the timing logic and switch driver circuitry 10 has a further input that is directly coupled to the remote sense point. The switch driver portion of the circuitry 10 in that case contains additional circuitry that controls the power gate 7 so as to limit the slew rate of the voltage on the load side of the power gate 7, based on a signal at the further input (which represents the voltage of the load side). This allows the power gate 7 to be turned on more softly, thereby reducing in-rush current.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art.

What is claimed is:

1. An electronic system comprising:
a processing core;
a power supply circuit having a load voltage feedback input;
a power gate coupled to the power supply circuit to selectively provide power to the processing core;
a switch having a local state and a remote state to alternately route (i) a local sense point on a supply side of the power gate and (ii) a remote sense point on a load side of the power gate, to the feedback input of the power supply circuit; and
timing logic and driver circuitry coupled to control the power gate and the switch;
wherein the power supply circuit includes a control loop configured to provide a first transfer function responsive to the local state of the switch and a second transfer function responsive to the remote state of the switch.

2. The system of claim 1 wherein the timing logic and switch driver circuitry comprises a further input directly coupled to the remote sense point, the switch driver circuitry to control the power gate to limit slew rate on the load side of the power gate based on a signal at said further input.

3. The system of claim 1 wherein the power gate is directly connected between a power output of the power supply circuit and a power supply pin of the processing core.

4. The system of claim 1 wherein the power gate is directly connected between a ground pin of the processing core and a ground pin of the supply circuit.

5. The system of claim 1 wherein the timing logic and driver circuitry, while controlling the power gate and the switch, maintains a predefined timing between opening and closing of the power gate and selecting the local and remote states of the switch.

6. The system of claim 5 wherein the timing logic and driver circuitry in response to a processing core enable signal being asserted opens the power gate before selecting the remote state of the switch.

7. The system of claim 6 wherein the timing logic and driver circuitry in response to the processing core enable signal being de-asserted closes the power gate after selecting the local state of the switch.

8. The system of claim 5 wherein the timing logic and driver circuitry controls the power gate and the switch in response to a processing core enable signal.

9. The system of claim 8 wherein the predefined timing is in relation to the processing core enable signal.

10. The system of claim 8 further comprising:
a power manager that produces the processing core enable signal, wherein the processing core and the power manager are in the same integrated circuit die.

11. The system of claim 1 wherein the timing logic and driver circuitry controls the power gate and the switch in response to a processing core enable signal.

12. An electronic circuit comprising:
a power gate to be coupled to a power supply circuit to selectively provide power to a microprocessor core;
a switch having a local state and a remote state to alternately route (i) a local sense point on a supply side of the power gate and (ii) a remote sense point on a load side of the power gate, to a feedback input of the power supply circuit; and
timing logic and driver circuitry coupled to control the power gate and the switch;
wherein the power supply circuit includes a control loop configured to provide a first transfer function responsive to the local state of the switch and a second transfer function responsive to the remote state of the switch.

13. The circuit of claim 12 wherein the timing logic and driver circuitry, while controlling the power gate and the switch, maintains a predefined timing between opening and closing of the power gate and selecting the local and remote states of the switch.

14. The circuit of claim 13 wherein the timing logic and driver circuitry in response to a processing core enable signal being asserted open the power gate before selecting the remote state of the switch.

15. The circuit of claim 14 wherein the timing logic and driver circuitry in response to the processing core enable signal being de-asserted close the power gate after selecting the local state of the switch.

16. The circuit of claim 13 wherein the timing logic and driver circuitry controls the power gate and the switch in response to a processing core enable signal.

17. The circuit of claim 16 wherein the predefined timing is in relation to the processing core enable signal.

18. The circuit of claim 12 wherein the timing logic and driver circuitry controls the power gate and the switch in response to a processing core enable signal.

19. A method for operating an electronic system, comprising:
receiving a processing core enable signal; and
in response to the received processing core enable signal being asserted, signaling a power gate to open to thereby deliver power from a power supply circuit to a processing core and then switching a feedback input of the power supply circuit from a local sense point to a remote sense point; and
modifying the feedback input of the power supply using a first transfer function responsive to the local state of the switch and a second transfer function responsive to the remote state of the switch.

20. A method for operating an electronic system, comprising:
receiving a processing core enable signal; and
in response to the received processing core enable signal being de-asserted, switching a feedback input of a power supply circuit, that is delivering power from a power supply circuit to a processing core, from a remote sense point to a local sense point and then signaling a power gate to close to thereby stop delivering power to the processing core; and modifying the feedback input of the power supply using a first transfer function responsive to the local state of the switch and a second transfer function responsive to the remote state of the switch.

\* \* \* \* \*